United States Patent
Papoulias et al.

[11] Patent Number: 5,147,718
[45] Date of Patent: Sep. 15, 1992

[54] RADAR ABSORBER

[75] Inventors: Sotiri A. Papoulias, Madison; Henry Seiwatz, Wayne, both of N.J.

[73] Assignee: ISP Investments Inc., Wilmington, Del.

[21] Appl. No.: 513,693

[22] Filed: Apr. 24, 1990

[51] Int. Cl.⁵ ............................................. B32B 5/30
[52] U.S. Cl. ................................... 428/328; 428/212; 523/137
[58] Field of Search ................. 428/328, 212; 523/137

[56] References Cited
U.S. PATENT DOCUMENTS 4,116,906  9/1978  Ishino et al. ..................... 260/22 A
4,414,339  11/1983  Solc et al. .......................... 523/137

OTHER PUBLICATIONS

Knott, E. F., J. F. Shaeffer and M. R. Toley, "Radar Cross Section," 1985.

Primary Examiner—Paul J. Thibodeau
Assistant Examiner—Mark Forman
Attorney, Agent, or Firm—Richard T. Laughlin; Joshua J. Ward

[57] ABSTRACT

A radar absorber, for use as a sprayable paint, or for use as a plastic sheet, is provided. The radar absorber is used to cover a structural part of an aircraft or to shield a part of a naval vessel. The absorber, or coating in this embodiment, includes an inner layer having an elastomeric carrier material with a carbonyl iron powder dispersed therein, or disposed therein, of a regular particle size of about 4 to 5 micron, and includes an outer layer having an elastomeric carrier material with a carbonyl iron powder dispersed therein, or disposed therein, of a fine particle size of about 0.5 to 1.5 micron.

8 Claims, 1 Drawing Sheet

RADAR ABSORBER

The invention relates to a radar absorber, and in particular the invention relates to a radar absorber coating having an inner coating layer of relatively high radar wave reflectivity and having an outer coating layer of relatively low radar wave reflectivity.

BACKGROUND OF THE INVENTION

The prior art radar absorber is described in a publication by Knott, E. F., J. F. Shaeffer and M. R. Tuley, Editors, entitled "Radar Cross Section", published by Artech House, Inc., Norwood, Me., U.S.A. 1985 which is a layer of carbonyl iron particles.

The prior art radar absorber provides a relatively low radar attenuation magnitude over a selected broadband frequency range.

SUMMARY OF THE INVENTION

According to the present invention, a radar absorber is provided. This radar absorber comprises an inner layer having a carrier material containing a carbonyl iron powder with a selected uniform grade size of about 4 to about 5 microns, and an outer layer having a carrier material containing a carbonyl iron powder with a selected uniform grade size of about 0.5 to about 1.5 micron.

By using the two layers having selected grade sizes of carbonyl iron powder, the radar absorber provides a relatively high radar attenuation magnitude over the selected broadband frequency range.

The foregoing and other objects, features and the advantages of the invention will be apparent from the following description of the preferred embodiment of the invention as illustrated in the accompanying drawing.

DESCRIPTION OF THE PREFERRED EMBODIMENT

Figure 1:
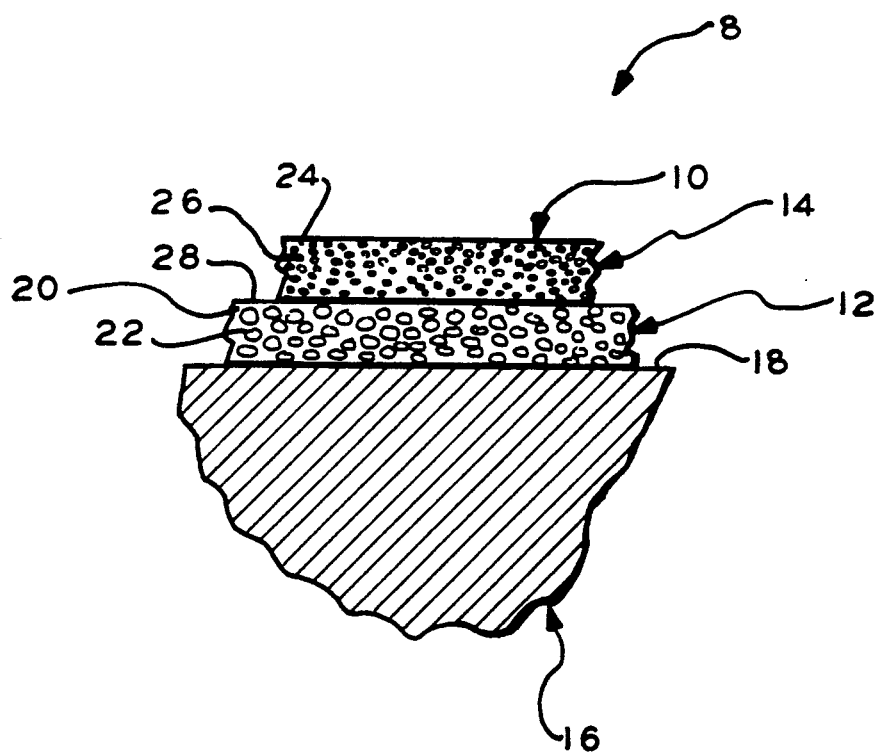
FIG. 1 is a schematic section view of a portion of a radar absorbing coating according to the invention.

As shown in FIG. 1, an assembly generally indicated at 8, which includes a radar absorber or coating generally indicated at 10 is provided. The coating 10 has an inner layer 12 and an outer layer 14. The assembly 8 also includes a structural part 16 such as an aircraft, which has a surface 18. The coating 10 is disposed on the structural part 16. The inner layer 12 is disposed on surface 18. Outer layer 14 is disposed on the inner layer 12.

The inner layer 12 includes an elastomeric or carrier material 20, and includes a regular size, carbonyl iron powder 22. Powder 22 has a selected size of about 4 to about 5 micron, and is a uniform grade size powder. This material has a relatively high radar wave absorption.

The outer layer 14 includes an elastomeric or carrier material 24, and includes a fine size, carbonyl iron powder 26. Powder 26 has a selected size range of about 0.5 to about 1.5 micron, and is a uniform grade powder with a uniform size grade and has a relatively low radar wave reflectivity. A uniform particle powder is a powder with a uniform size grade and has a relatively narrow distribution around a uniform particle diameter. The inner layer 12 has a surface 28 on which outer layer 14 is disposed.

In operation or use, the coating 10 has the effect that an incoming radar wave will initially easily enter the outer layer 14 with minimum reflection and then be absorbed by the inner layer 12. The reflectivity magnitude associated with the incoming radar wave will decrease, that is, the reflectivity loss magnitude will increase by using the two-layer coating 10.

A primary use of coating 10 is as a sprayable multilayer coating or a sprayable aircraft paint.

The advantages of the invention are as indicated hereafter.

A. Coating 10 provides a relatively higher radar attenuation magnitude over a selected broadband frequency range than the prior art coating.

B. The radar attenuation magnitude over a selected broadband frequency range in coating 10 can be adjusted by adjusting particle size during manufacture thereof.

C. The reflectivity magnitude of coating 10 is relatively less, that is the reflectivity loss magnitude is relatively more than the reflectivity magnitude of the prior art coating.

While the invention has been described in its preferred embodiment, it is to be understood that the words which have been used are words of description rather than limitation and that changes may be made within the purview of the appended claims without departing from the true scope and spirit of the invention in its broader aspects.

For example, instead of coating 10, a plastic sheet can be provided comprising an inner layer having a plastic carrier material and having a carbonyl iron powder disposed therein of a selected size of about 4 to 5 micron approximately and comprising an outer layer having a plastic carrier material and having a carbonyl iron powder disposed therein of a selected size of 0.5 to 1.5 micron approximately, for use on an aircraft or on a navy vessel.

What is claimed is:

1. A radar absorber comprising:
   an inner layer having a coating material containing a carbonyl iron powder with a selected uniform grade size particle disposed therein; and
   an outer layer having a coating material containing a carbonyl iron powder with a selected uniform grade size of a finer size particle than that in the inner layer disposed therein, wherein the iron carbonyl particle of the inner layer has a grade size of about 4 to about 5 microns; and the finer size iron carbonyl particle of the outer layer has a grade size of about 0.5 to about 1.5 microns.

2. The radar absorber as defined in claim 1, including a structural part having a surface on which the inner layer is disposed, said inner layer having a surface on which the outer layer is disposed.

3. The radar absorber as defined in claim 1, wherein the coating material of the inner layer and the coating material of the outer layer are plastic materials.

4. The radar absorber of claim 1, wherein the coating material of the inner layer and the coating material of the outer layer are sprayable elastomeric materials.

5. A method of manufacture of a radar absorber having a relatively high radar attenuation magnitude over a selected broadband frequency range with an inner layer and an outer layer including the steps: providing an inner layer of a coating material containing a carbonyl iron powder of particles of a grade size of about 4 to about 5 microns mixed therein; and applying an outer layer material over the inner layer, said outer layer containing carbonyl iron powder of a grade size of about 0.5 to about 1.5 microns mixed therein.

6. The method as defined in claim 5, including a structural part having a surface on which the inner layer is disposed, said inner layer having a surface on which the outer layer is disposed.

7. The method as defined in claim 5, wherein the carrier material of the inner layer and the carrier material of the outer layer are plastic materials, for providing a two-layer plastic sheet.

8. The radar absorber of claim 5, wherein the carrier material of the inner layer and the carrier material of the outer layer are sprayable elastomeric materials, for spraying the inner layer on a structural part and for spraying the outer layer over the inner layer.

* * * * *